United States Patent
Kroeger et al.

(10) Patent No.: US 7,733,983 B2
(45) Date of Patent: Jun. 8, 2010

(54) SYMBOL TRACKING FOR AM IN-BAND ON-CHANNEL RADIO RECEIVERS

(75) Inventors: Brian William Kroeger, Sykesville, MD (US); Kun Wang, New Providence, NJ (US)

(73) Assignee: iBiquity Digital Corporation, Columbia, MD (US)

( * ) Notice: Subject to any disclaimer, the term of this patent is extended or adjusted under 35 U.S.C. 154(b) by 1036 days.

(21) Appl. No.: 11/273,099

(22) Filed: Nov. 14, 2005

(65) Prior Publication Data

US 2007/0110185 A1 May 17, 2007

(51) Int. Cl.
H03D 1/24 (2006.01)
H04L 7/00 (2006.01)
(52) U.S. Cl. .................. 375/320; 375/354
(58) Field of Classification Search .......... 375/320, 375/316
See application file for complete search history.

(56) References Cited

U.S. PATENT DOCUMENTS

| | | | |
|---|---|---|---|
| 5,544,200 A * | 8/1996 | An | 375/344 |
| 5,588,022 A | 12/1996 | Dapper et al. | |
| 5,625,652 A | 4/1997 | Petranovich | |
| 5,764,102 A | 6/1998 | Cochran et al. | |
| 5,859,876 A | 1/1999 | Dapper et al. | |
| 6,058,150 A | 5/2000 | Ghosh | |
| 6,074,086 A | 6/2000 | Yonge, III | |
| 6,091,702 A | 7/2000 | Saiki | |
| 6,122,135 A * | 9/2000 | Stich | 360/78.09 |
| 6,137,847 A | 10/2000 | Stott et al. | |
| 6,141,372 A * | 10/2000 | Chalmers | 375/147 |
| 6,154,510 A | 11/2000 | Cochran et al. | |
| 6,269,132 B1 | 7/2001 | Yonge, III | |
| 6,320,915 B1 | 11/2001 | Stott et al. | |
| 6,421,401 B1 | 7/2002 | Palin | |
| 6,898,249 B2 | 5/2005 | Kroeger et al. | |
| 2002/0145971 A1 | 10/2002 | Cho et al. | |
| 2002/0150181 A1 | 10/2002 | Sayeed | |
| 2003/0107986 A1 | 6/2003 | Malkemes et al. | |
| 2003/0135374 A1 * | 7/2003 | Hardwick | 704/264 |
| 2003/0137928 A1 | 7/2003 | Kroeger et al. | |

(Continued)

FOREIGN PATENT DOCUMENTS

EP 0788265 A2 8/1997

(Continued)

Primary Examiner—David C. Payne
Assistant Examiner—Brian J Stevens
(74) Attorney, Agent, or Firm—Robert P. Lenart, Esq.; Pietragallo Gordon Alfano Bosick & Raspanti, LLP (57) ABSTRACT

A method for symbol tracking in AM in-band on-channel radio receivers comprises the steps of: receiving a stream of time domain samples; assembling a set of the time domain samples equal to a symbol time plus a half symbol delay in response to a symbol timing adjustment value for each symbol period; interpolating the time domain samples; partitioning the interpolated time domain samples into a first group of samples representing half-off symbols and a second group of samples representing on-time symbols; processing the first and second groups of samples to produce the symbol timing adjustment value; and outputting the second group of samples representing on-time symbols at a symbol rate. An apparatus that performs the method is also included.

20 Claims, 6 Drawing Sheets

U.S. PATENT DOCUMENTS

| | | | |
|---|---|---|---|
| 2003/0169807 A1* | 9/2003 | Straeussnigg | 375/222 |
| 2005/0074067 A1* | 4/2005 | Nieto et al. | 375/260 |
| 2005/0249181 A1* | 11/2005 | Vijayan et al. | 370/344 |
| 2006/0041609 A1* | 2/2006 | Pellar | 708/290 |

FOREIGN PATENT DOCUMENTS

| | | |
|---|---|---|
| EP | 0788265 A3 | 10/1999 |
| EP | 1100237 | 5/2001 |
| EP | 1330087 | 7/2003 |
| WO | WO 97/08866 | 3/1997 |

* cited by examiner

SYMBOL TRACKING FOR AM IN-BAND ON-CHANNEL RADIO RECEIVERS

FIELD OF THE INVENTION

This invention relates to radio broadcasting and, more particularly, to methods of and apparatus for equalizing a signal in a receiver for use with an in-band on-channel digital broadcasting system.

BACKGROUND OF THE INVENTION

An in-band on-channel (IBOC) digital broadcasting system simultaneously broadcasts analog and digital signals in a standard AM broadcasting channel. One AM IBOC system is described in U.S. Pat. No. 5,588,022. The broadcast signal includes an amplitude modulated radio frequency signal having a first frequency spectrum. The amplitude modulated radio frequency signal includes a first carrier modulated by an analog program signal. The signal also includes a plurality of digitally modulated subcarriers within a bandwidth that encompasses the first frequency spectrum. Each of the digitally modulated subcarriers is modulated by a digital signal. A first group of the digitally modulated subcarriers lies within the first frequency spectrum and is modulated in quadrature with the first carrier signal. Second and third groups of the digitally modulated subcarriers lie outside of the first frequency spectrum and are modulated both in-phase and in quadrature with the first carrier signal. The subcarriers are divided into primary, secondary and tertiary partitions. Some of the subcarriers are complementary subcarriers.

The digital information is transmitted in successive symbols. Symbols transmitted in the IBOC system must be tracked in the receiver modem to align the demodulation of the symbols with the incoming stream of signal samples. This invention provides a symbol tracking algorithm for use in an HD Radio™ digital modem.

SUMMARY OF THE INVENTION

This invention provides a method for symbol tracking in AM in-band on-channel radio receivers. The method comprises the steps of: receiving a stream of time domain samples; assembling a set of the time domain samples equal to a symbol time plus a half symbol delay in response to a symbol timing adjustment value for each symbol period; interpolating the time domain samples; partitioning the interpolated time domain samples into a first group of samples representing half-off symbols and a second group of samples representing on-time symbols; processing the first and second groups of samples to produce the symbol timing adjustment value; and outputting the second group of samples representing on-time symbols at a symbol rate.

In another aspect, the invention provides an apparatus for symbol tracking in AM in-band on-channel radio receivers. The apparatus comprises an input for receiving a stream of time domain samples; a processor for assembling a set of the time domain samples equal to a symbol time plus a half symbol delay in response to a symbol timing adjustment value for each symbol period, interpolating the time domain samples, partitioning the interpolated time domain samples into a first group of samples representing half-off symbols and a second group of samples representing on-time symbols, and processing the first and second groups of samples to produce the symbol timing adjustment value; and an output for outputting the second group of samples representing on-time symbols at a symbol rate.

DETAILED DESCRIPTION OF THE INVENTION

Figure 1:
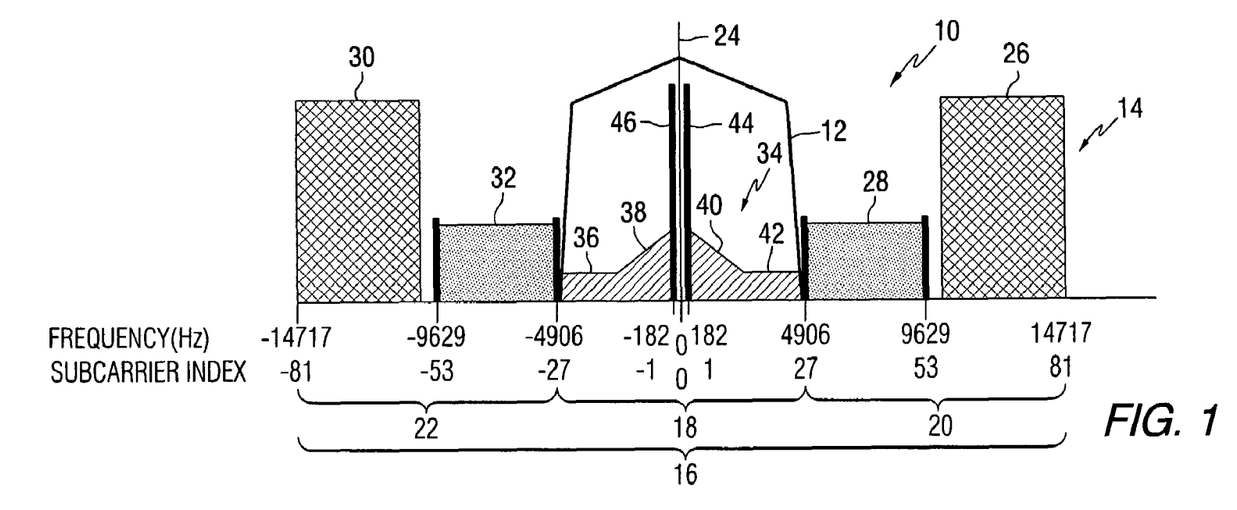
FIG. 1 is a spectral diagram of the AM hybrid IBOC signal.

Referring to the drawings, FIG. 1 is a spectral diagram of an AM hybrid IBOC signal. The AM hybrid IBOC waveform 10 includes the conventional AM analog signal 12 (bandlimited to about ±5 kHz) along with a nearly 30 kHz wide digital audio broadcasting (DAB) signal 14 transmitted beneath the AM signal. The spectrum is contained within a channel 16 having a bandwidth of about 30 kHz. The channel is divided into a central frequency band 18, and upper 20 and lower 22 frequency bands. The central frequency band is about 10 kHz wide and encompasses frequencies lying within about ±5 kHz of the center frequency $f_o$ of the channel. The upper sideband extends from about +5 kHz from the center frequency to about +15 kHz from the center frequency. The lower sideband extends from about −5 kHz from the center frequency to about −15 kHz from the center frequency.

AM hybrid IBOC DAB signal format in one embodiment of the invention comprises the analog modulated carrier signal 24 plus 162 OFDM subcarrier locations spaced at approximately 181.7 Hz, spanning the central frequency band and the upper and lower sidebands. Coded digital information, representative of the audio or data signals (program material), is transmitted on the subcarriers. The symbol rate is less than the subcarrier spacing due to a guard time between symbols.

As shown in FIG. 1, the upper sideband is divided into a primary partition 26 and a secondary partition 28, and the lower sideband is divided into a primary partition 30 and a secondary partition 32. The digital signals are transmitted in the primary and secondary partitions on either side of the host analog signal, as well as underneath the host analog signal in a tertiary partition 34. The tertiary partition 34 can be considered to include a plurality of groups of subcarriers labeled 36, 38, 40 and 42 in FIG. 1. Subcarriers within the tertiary partition that are positioned near the center of the channel are referred to as inner subcarriers and subcarriers within the tertiary partition that are positioned farther from the center of the channel are referred to as outer subcarriers. In this example, the power level of the inner subcarriers in groups 38 and 40 is shown to decrease linearly with frequency spacing from the center frequency. The remaining groups of subcarriers 36 and 42 in the tertiary sideband have substantially constant power levels.

FIG. 1 also shows two reference subcarriers 44 and 46, for system control, that are positioned at the first subcarrier positions immediately adjacent to the analog modulated carrier and have power levels which are fixed at a value that is different from the other sidebands.

The center carrier 24, at frequency $f_o$, is not QAM modulated, but carries the main analog amplitude modulated carrier. The synchronization and control subcarriers 44 and 46 are modulated in quadrature to the carrier. The remaining subcarriers of the tertiary partition, positioned at locations designated as 2 through 26 and −2 through −26 on either side of the AM carrier, are modulated with QPSK. Representative subcarrier locations are identified by the subcarrier index shown in FIG. 1. Subcarriers at locations 2 through 26 and −2 through −26 on either side of the central frequency, are referred to as tertiary subcarriers and are transmitted in complementary pairs such that the modulated resultant DAB signal is in quadrature to the analog modulated AM signal. The use of complementary subcarrier pairs in an AM IBOC DAB system is shown in U.S. Pat. No. 5,859,876. The synchronization and control subcarriers 44 and 46 are also modulated as a complementary pair.

The double sideband (DSB) analog AM signal occupies the bandwidth in the ±5 kHz region. The lower and upper tertiary partitions occupy sub-bands from about 0 to about −5 kHz and from about 0 to about +5 kHz regions, respectively. These tertiary partitions are negative complex conjugates of each other and are characterized as complementary. This complementary property maintains an orthogonal relationship between the analog and digital tertiary signals such that they can be separated in a receiver, while existing conventional receivers can still receive the analog AM signal. The tertiary partitions must be complementary combined to extract the digital signal while canceling the analog crosstalk. The secondary partitions also have the complementary property, so they can be processed at the receiver either independently, or after complementary combining, depending on interference conditions and audio bandwidth. The primary partitions are transmitted independently.

Figure 2:
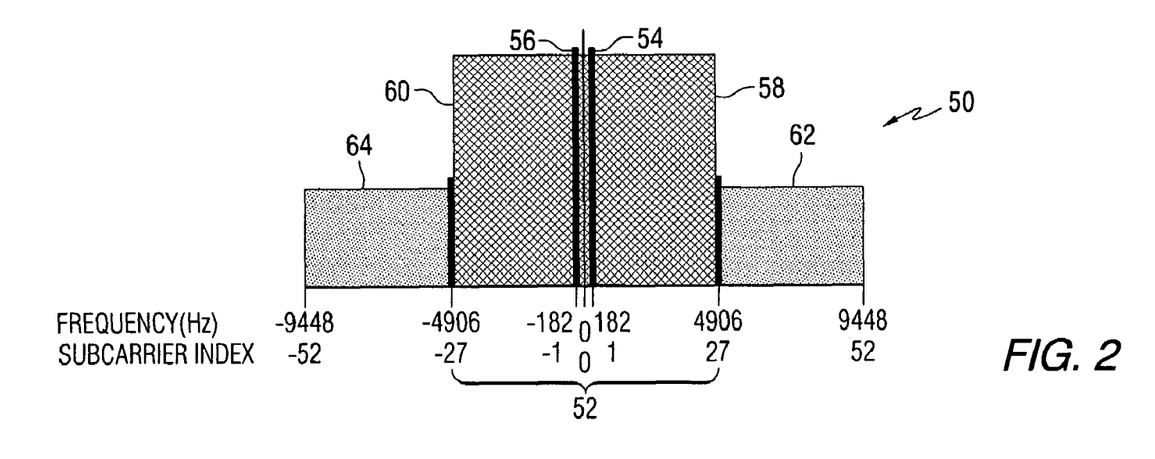
FIG. 2 is a spectral diagram of the AM all-digital IBOC signal.

FIG. 2 is a spectral diagram of an all-digital IBOC signal 50. The power of the central frequency band 52 subcarriers is increased, relative to the hybrid format of FIG. 1. Again, the two subcarriers 54 and 56 located at locations −1 and +1 use binary phase shift keying to transmit timing information. A core upper sideband 58 is comprised of carriers at locations 2 through 26, and a core lower sideband 60 is comprised of subcarriers at locations −2 through −26. Sidebands 58 and 60 form primary partitions. Two groups 62 and 64 of additional enhancement subcarriers occupy locations 27 through 54 and −54 through −27 respectively. Group 62 forms a secondary partition and group 64 forms a tertiary partition. The all-digital format of FIG. 2 is very similar to the hybrid format except that the AM signal is replaced with a delayed and digitally encoded tuning and backup version of the program material. The central frequency band occupies approximately the same spectral location in both the hybrid and all-digital formats. In the all-digital format, there are two options for transmitting the main version of the program material in combination with the tuning and backup version. The all-digital system has been designed to be constrained within ±10 kHz of the channel central frequency, $f_o$, where the main audio information is transmitted within ±5 kHz of $f_o$, and the less important audio information is transmitted in the wings of the channel mask out to ±10 kHz at a lower power level. This format allows for graceful degradation of the signal while increasing coverage area. The all-digital system carries a digital time diversity tuning and backup channel within the ±5 kHz protected region (assuming the digital audio compression is capable of delivering both the main and audio backup signal within the protected ±5 kHz). The modulation characteristics of the all-digital system are based upon the AM IBOC hybrid system.

The all-digital IBOC signal includes a pair of primary partitions in the ±5 kHz region, a secondary partition in the −5 kHz to −10 kHz region, and a tertiary partition in the +5 kHz to +10 kHz region. The all-digital signal has no analog component, and all partitions are transmitted independently (that is, the partitions are not complementary).

Figure 3:
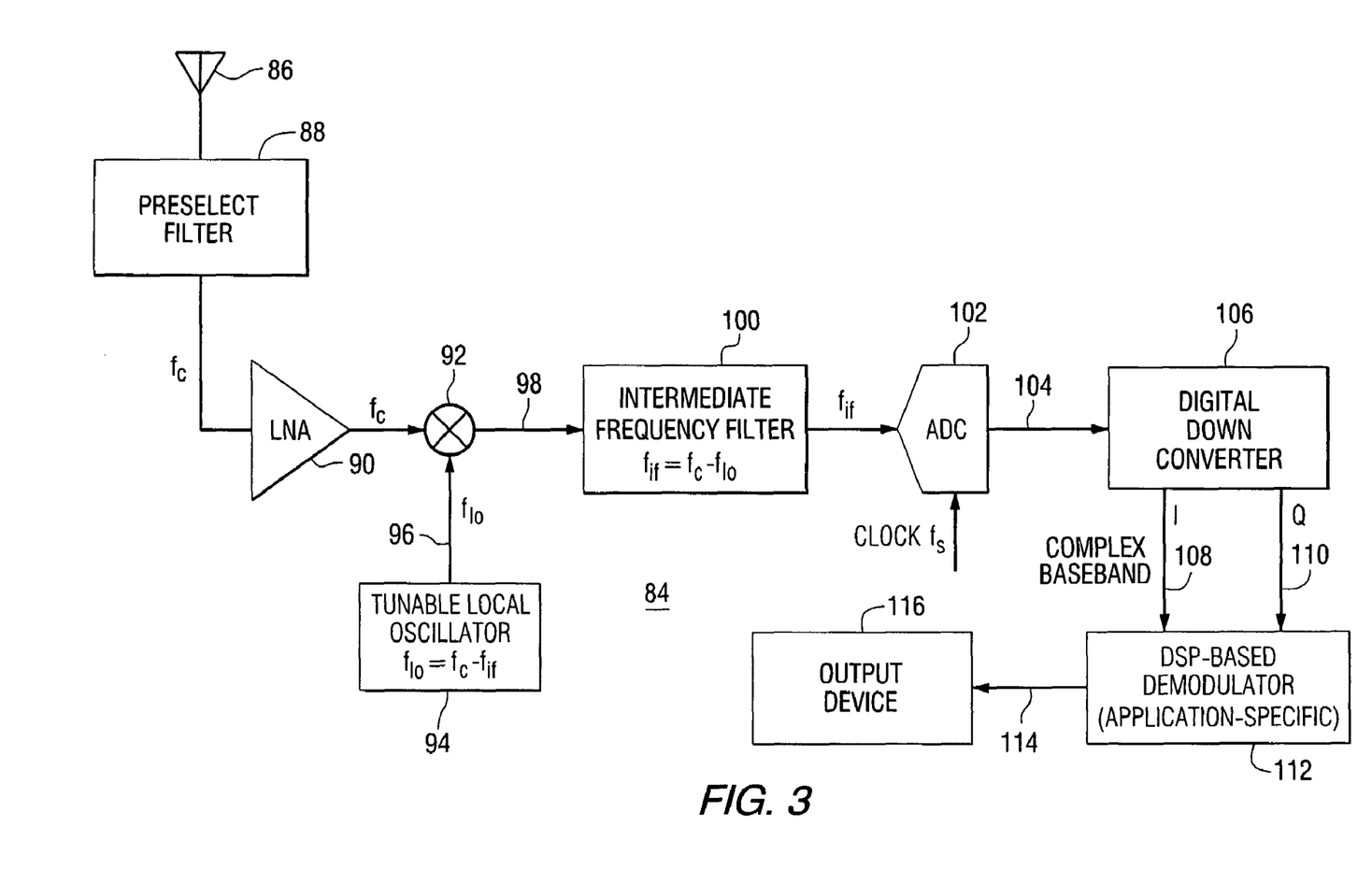
FIG. 3 is a functional block diagram of an AM IBOC receiver.

FIG. 3 is a functional block diagram of an IBOC receiver 84 constructed in accordance with this invention. The IBOC signal is received on antenna 86. A bandpass preselect filter 88 passes the frequency band of interest, including the desired signal at frequency $f_c$, but rejects the image signal at $f_c-2f_{if}$ (for a low side lobe injection local oscillator). Low noise amplifier 90 amplifies the signal. The amplified signal is mixed in mixer 92 with a local oscillator signal $f_{lo}$, supplied on line 94 by a tunable local oscillator 96. This creates sum $(f_c+f_{lo})$ and difference $(fc-f_{lo})$ signals on line 98. Intermediate frequency filter 100 passes the intermediate frequency signal $f_{if}$ and attenuates frequencies outside of the bandwidth of the modulated signal of interest. An analog-to-digital converter 102 operates using a clock signal $f_s$ to produce digital samples on line 104 at a rate $f_s$. Digital down converter 106 frequency shifts, filters and decimates the signal to produce lower sample rate in-phase and quadrature signals on lines 108 and 110. A digital signal processor based demodulator 112 then provides additional signal processing to produce an output signal on line 114 for output device 116.

Figure 4:
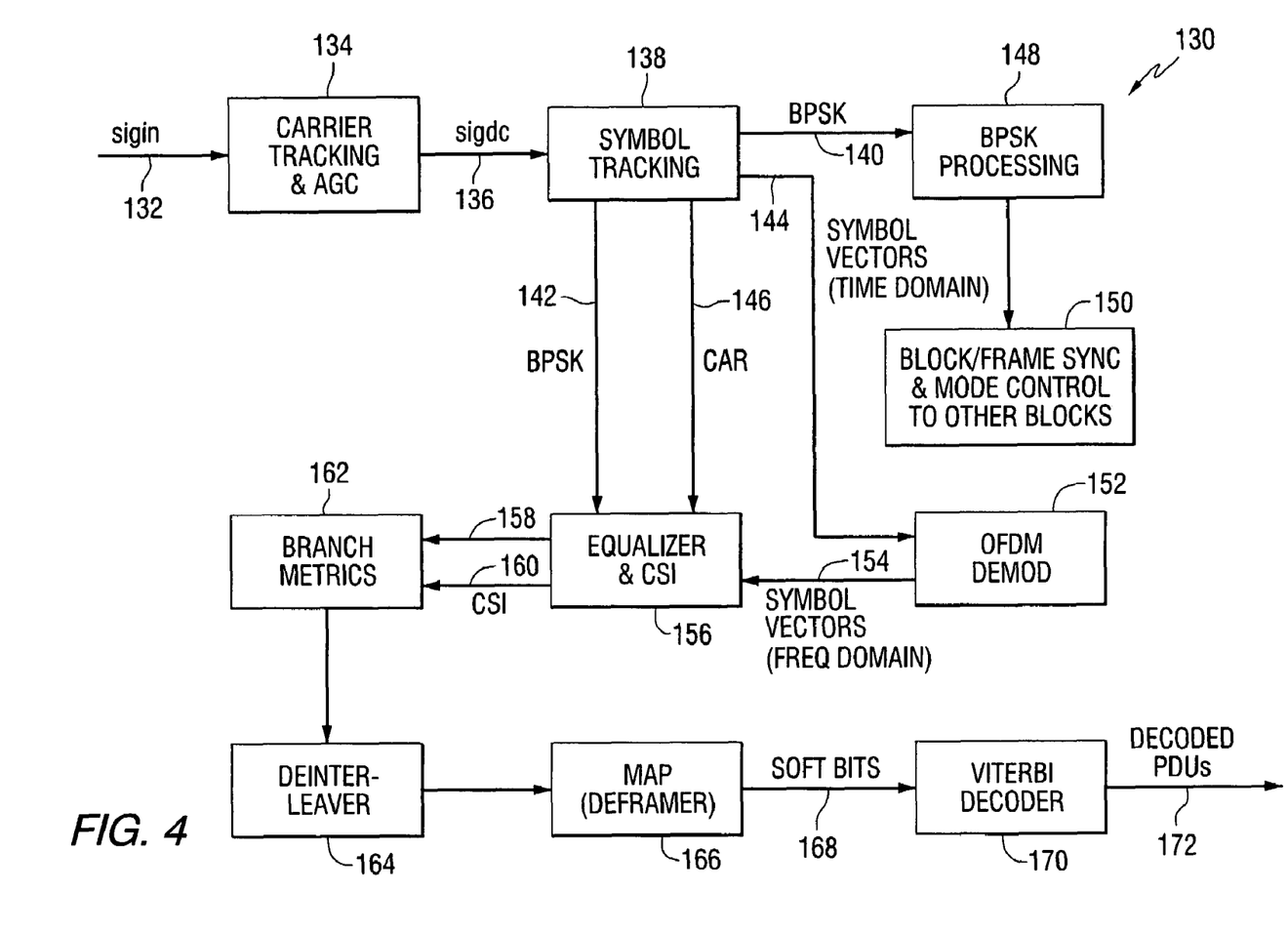
FIG. 4 is a block diagram of a modem for an AM IBOC receiver.

The receiver in FIG. 3 includes a modem constructed in accordance with this invention. FIG. 4 is a functional block diagram of an AM HD Radio™ modem 130 showing the functional location of the carrier tracking of this invention. An input signal on line 132 from the digital down converter is subject to carrier tracking and automatic gain control as shown in block 134. The resulting signal on line 136 is subjected to a symbol tracking algorithm 138 that produces the BPSK signal on lines 140 and 142, symbol vectors (in the time domain) on line 144, and the analog modulated carrier on line 146. BPSK processing, as shown in block 148 produces block/frame sync and mode control information 150 that is used by functions illustrated in other blocks. An OFDM demodulator 152 demodulates the time domain symbol vectors to produce frequency domain symbol vectors on line 154.

The equalizer 156 processes the frequency domain symbol vectors in combination with the BPSK and carrier signals to produce equalized signals on line 158 and channel state information on line 160. These signals are processed to produce branch metrics 162, deinterleaved in a deinterleaver 164, and mapped in a deframer 166 to produce soft decision bits on line 168. A Viterbi decoder 170 processes the soft decision bits to produce decoded program data units on line 172.

This invention provides a symbol tracking algorithm for use in an HD Radio™ digital modem. The symbol tracking algorithm aligns the demodulation of OFDM symbols with the incoming stream of signal samples. The input comprises a stream of time domain samples (sampled at approximately 46,878 Hz) from the carrier tracking output. The output of the symbol tracking function is a sequence of time domain symbol vectors at the symbol rate (approximately 172 Hz). The symbol tracking algorithm first acquires the symbol timing, then tracks the symbol timing. It is designed to operate at noise and interference levels higher than those where it is possible to decode the digital information. Furthermore the algorithm is designed to accommodate fading-like conditions, such as from grounded conductive structures (GCS).

Figure 5:
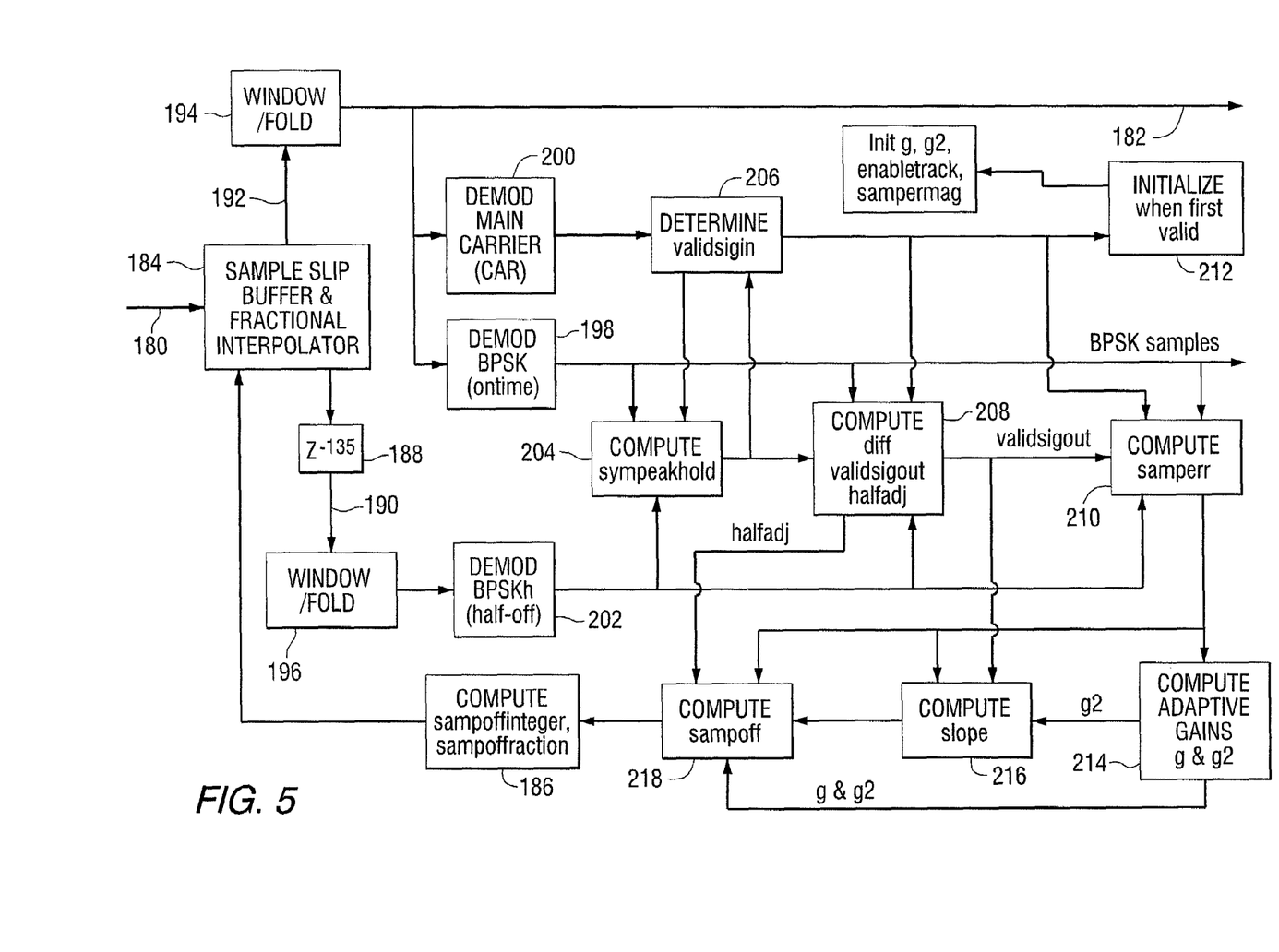
FIG. 5 is a functional block diagram of the symbol tracking algorithm of this invention.

FIG. 5 is a functional block diagram that illustrates the symbol tracking algorithm. The input 180 comprises a stream of time domain samples (sampled at approximately 46,878 Hz) from the carrier tracking output. The output of the symbol tracking (on line 182) is a sequence of time domain symbol vectors (256 elements) at the symbol rate (approximately 172 Hz).

A sample slip buffer and fractional interpolator function 184 receives the input samples and selects a group of samples (overlapping groups) for each symbol time. Each successive OFDM symbol is nominally spaced by 270 signal samples plus or minus the integer slip samples. The effective delay, or timing adjustment, of the input is further adjusted by a fractional sample interpolation value (sampoffraction) and an integer sample slip value (sampoffinteger), which are updated each new symbol period, as illustrated by block 186. The sampoffinteger and sampoffraction values control the integer and fractional sample slip values for use in the Sample Slip Buffer. The fractional interpolator portion of the sample slip buffer eliminates the need for later correction in the frequency domain; but it also reduces the tracking noise within the loop.

Figure 6:
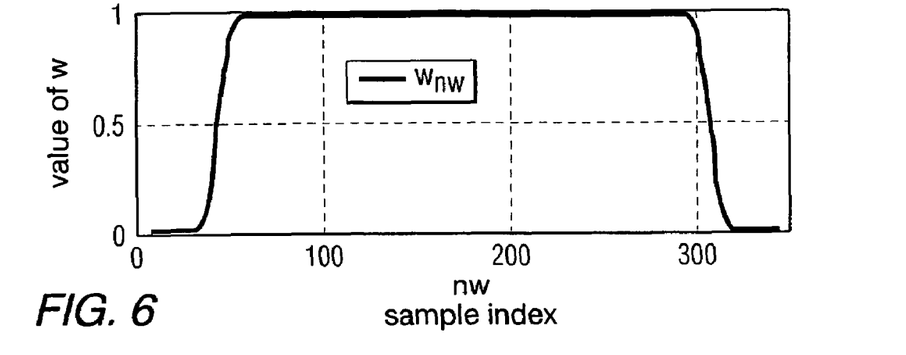
FIG. 6. is a plot of a window function used for OFDM demodulation.

In this example, the input symbols were created (at the transmitter) using OFDM modulation with a 256-point IFFT for each successive input symbol. This IFFT result is extended to 349 time domain samples (indexed 0 to 348) using a cyclic prefix extension, while cyclic shifting bin 0 (dc) to the $174^{th}$ sample (bin 174). This conveniently places the starting sample of the pre-extended IFFY at the center reference point of the symbol pulse, allowing flexibility in the pulse shaping after cyclic extension. FIG. 6 is a plot of window function w used for OFDM demodulation. The transmitter tapers the ends of the 349-sample symbol with a root-Nyquist-raised-cosine window. These symbols are sequentially overlap-added to the output sample stream with each new symbol spaced by 270 samples.

To process the next OFDM symbol, the slip buffer must assemble a number of sequential samples equal to one extended and tapered symbol time (349 samples), plus a half symbol delay (135 samples) for the half-off symbol timing ambiguity resolution, for a total of 484 samples needed by the slip buffer. As the algorithm processes each new symbol, another 270 (±slip) input samples are shifted into this buffer.

The 484-sample buffer contents are then interpolated using the fractional sample interpolation value (sampoffraction), to form an interpolated 484-sample vector for subsequent symbol demodulation. This interpolation for sampoffraction is necessary to adjust the slip buffer at time offsets between the discrete sample locations, since whole sample slips do not have sufficient time resolution.

For convenience in implementing the interpolation filter, 3 zero-value samples are appended to each end of the 484-sample buffer for a new total of 490 samples. This is done in the Sample Slip Buffer and Fractional Interpolator block 184. A 7-tap FIR filter is convolved with the buffer starting with the 7 taps coinciding with the first 7 buffer samples to yield the first output interpolated sample. Convolution is the conventional process of applying FIR filter taps as a sliding weighting window across the digital input signal (490 sample buffer in this case). The filter is advanced through the buffer producing a new interpolated sample at each increment until the last interpolated sample is obtained when the 7 filter taps correspond to the last 7 buffer samples. The 490-sample output vector is reduced by 6 samples from the input due to the span of the interpolation filter, eliminating the 3 zero-padded samples at either end to produce a 484-sample vector.

The 484-sample buffer is then partitioned into 2 segments representing the half-off (exiting block 188 on line 190) and on-time symbols (on line 192). The first (oldest) 349 samples are grouped as the half-off symbol, while the last 349 samples (135 samples ahead of half-off) are grouped as the on-time symbol. Notice that the middle samples overlap both the on-time and half-off symbols.

An algorithm to get the next set of input samples from an input sample sequence and interpolate these samples for subsequent demodulation is described next. The signal input is the semi-infinite complex sample sequence sig where the samples are assumed to be a number from 0 to n. An integer variable sampindx represents the sample index of the start of the previous symbol, slip is the computed integer number of samples (nominally 0 after initial acquisition) to slip in the buffer for this next symbol, and sampoffraction is the fractional sample slip value for this next symbol. Vector symsampsext is the output for subsequent demodulation.

---

"Algorithm for sample slip buffer & fractional interpolation"
sampindx = sampindx + 270 + slip ; "sample index for next symbol"
symsamps(k) = sig(k) ; k = sampindx...sampindx + 483 "get next samples"

$$\text{symsampsext1} = \text{stack}\left(\begin{bmatrix}0\\0\\0\end{bmatrix}, \text{symsamps}, \begin{bmatrix}0\\0\\0\end{bmatrix}\right);$$

"append 3 zeros on either end"

for k = 0...6 ; "compute coeffs for fractional sample interpolation"
  x = k − 3 − sampoffraction ; "interpolation value, −0.5 < x < 0.5"

$$\text{winterp}(k) = \begin{cases} \dfrac{\sin(\pi \cdot x)}{\pi \cdot x} \cdot \cos\left(\dfrac{\pi \cdot x}{8}\right)^2; & \text{if } |x| > 10^{-6} \\ 1; & \text{otherwise "divide by zero protection"} \end{cases}$$

"apply interpolation filter (convolve) for fractional sample interpolation"

$$\text{symsampsext}(n) = \sum_{k=0}^{6} \text{symsampsext1}(n+k) \cdot \text{winterp}(k); \; n = 0 \ldots 483.$$

---

A window/fold function is applied to both the on-time symbol samples and the delayed half-off symbol samples, as illustrated by blocks 194 and 196. The 349 samples are first windowed using the prestored window function w(k), computed as follows:

"Generate prestored window samples w(k)"

$$H(x) = \begin{cases} 1; & |x| \leq \dfrac{1-\alpha}{2} \\ \dfrac{1}{2}\cdot\left(1+\cos\left[\dfrac{\pi\cdot(2\cdot|x|+\alpha-1)}{2\cdot\alpha}\right]\right); & |x| > \dfrac{1-\alpha}{2} \wedge |x| < \dfrac{1+\alpha}{2} \\ 0; & \text{otherwise} \end{cases}$$

where $\alpha = \dfrac{7}{128}$ $$G(x) = \dfrac{1}{4\cdot\sqrt{\pi}} \cdot \exp(-4096 \cdot x^2)$$

$$w(k) = \sqrt{\sum_{k1=100}^{100}\left[G\left(\dfrac{k1}{256}\right) \cdot H\left(\dfrac{k-k1-174}{256}\right)\right]} \; ; \; k = 0 \ldots 348.$$

The demodulated symbol values for BPSK, main carrier CAR, and half-off delayed BPSKh are computed after windowing (as illustrated in blocks 198, 200 and 202) and folding the appropriate symbol samples symsamps. CAR is the analog modulated carrier. BPSK and BPSKh are the subcarriers that are adjacent to the analog modulated carrier.

The main carrier CAR is demodulated by simply summing the complex samples, while BPSK and BPSKh require vector multiplication by a complex phasor representative of the first DFT bin. The vector of samples symsamps is an external output to be used in the subsequent OFDM Demodulation, BPSK processing, and (optionally) Flat Fade Compensation algorithms. The BPSK and CAR values are available for use in the symbol tracking function. The algorithm is summarized as follows:

---

"Algorithm to demodulate symbols CAR, BPSK, BPSKh"
"compute on - time symsamps & symbols CAR &
BPSK for external output"
    ofdmextw(k) = symsampsext(k + 135) w · (k) ; k = 0...348 "window"

$$ofdm(k) = \begin{cases} ofdmextw(k) + ofdmextw(k+256); & k = 0\ldots92 \\ ofdmextw(k); & k = 93\ldots255 \end{cases};$$

"fold"

symsamps(k) = ofdm(mod(k + 174,256) ; "cyclic shift"

$$CAR(k) = \sum_{k=0}^{255} symsamps(k); \text{"demodulate main carrier CAR"}$$

$$BPSK(k) = \sum_{k=0}^{255} Im[symsamps(k)] \cdot \exp\left(-j \cdot \frac{\pi \cdot k}{128}\right); \text{"demodulate BPSK"}$$

"compute BPSKh symbol"
    ofdmextwh(k) = symsampsext(k) · w(k) ; k = 0...348 "window"

$$ofdmh(k) = \begin{cases} ofdmextwh(k) + ofdmextwh(k+256); & k = 0\ldots92 \\ ofdmextwh(k); & k = 93\ldots255 \end{cases}; \text{"fold"}$$

symsampsh(k) = ofdmh(mod(k + 174),256) ; "cyclic shift"

$$BPSKh(k) = \sum_{k=0}^{255} Im[symsampsh(k)] \cdot \exp\left(-j \cdot \frac{\pi \cdot k}{128}\right); \text{"demodulate BPSKh"}$$

---

The symbol timing error is derived from the demodulated BPSK symbols. The BPSK symbols for subcarriers at the ±1 subcarrier locations are described as:

$$D(n, 1) = \int (s(t) + n(t)) \cdot w(t) \cdot e^{-j \cdot 2 \cdot \pi \cdot f_c \cdot (t+\tau)} \cdot dt$$

$$= Q(n, 1) \cdot e^{-j \cdot 2 \cdot \pi \cdot f_c \cdot \tau}$$

$$= y \cdot e^{-j\left(2 \cdot \pi \cdot f_c \cdot \tau - \frac{\pi}{2}\right)}$$

$$D(n, -1) = \int (s(t) + n(t)) \cdot w(t) \cdot e^{j \cdot 2 \cdot \pi \cdot f_c \cdot (t+\tau)} \cdot dt$$

$$= Q(n, -1) \cdot e^{j \cdot 2 \cdot \pi \cdot f_c \cdot \tau}$$

$$= y \cdot e^{j\left(2 \cdot \pi \cdot f_c \cdot \tau - \frac{\pi}{2}\right)}.$$

The nth demodulated BPSK symbol is extracted as $$BPSK(n) = \frac{D(n, 1) - D*(n, -1)}{2}$$

$$= \frac{Q(n, 1) \cdot e^{-j \cdot 2 \cdot \pi \cdot f_c \cdot \tau} - Q*(n, -1) \cdot e^{-j \cdot 2 \cdot \pi \cdot f_c \cdot \tau}}{2}$$

$$= \frac{j \cdot y \cdot e^{-j \cdot 2 \cdot \pi \cdot f_c \cdot \tau} + j \cdot y \cdot e^{-j \cdot 2 \cdot \pi \cdot f_c \cdot \tau}}{2}$$

$$= j \cdot y \cdot e^{-j \cdot 2 \cdot \pi \cdot f_c \cdot \tau}$$

$$= y \cdot [\sin(2 \cdot \pi \cdot f_c \cdot \tau) + j \cdot \cos(2 \cdot \pi \cdot f_c \cdot \tau)]$$

where y=information imposed on the imaginary dimension of the BPSK symbol.

The timing error estimated from the BPSK symbol can be computed as $$\varepsilon(n) = \frac{Re\{BPSK(n)\} \cdot Im\{BPSK(n)\}}{|BPSK(n)|^2} = \frac{y^2 \cdot \sin(2 \cdot \pi \cdot f_c \cdot \tau) \cdot \cos(2 \cdot \pi \cdot f_c \cdot \tau)}{|y|^2}$$

but since y is real, then $$\varepsilon(n) = \sin(2 \cdot \pi \cdot f_c \cdot \tau) \cdot \cos(2 \cdot \pi \cdot f_c \cdot \tau).$$

Figure 7:
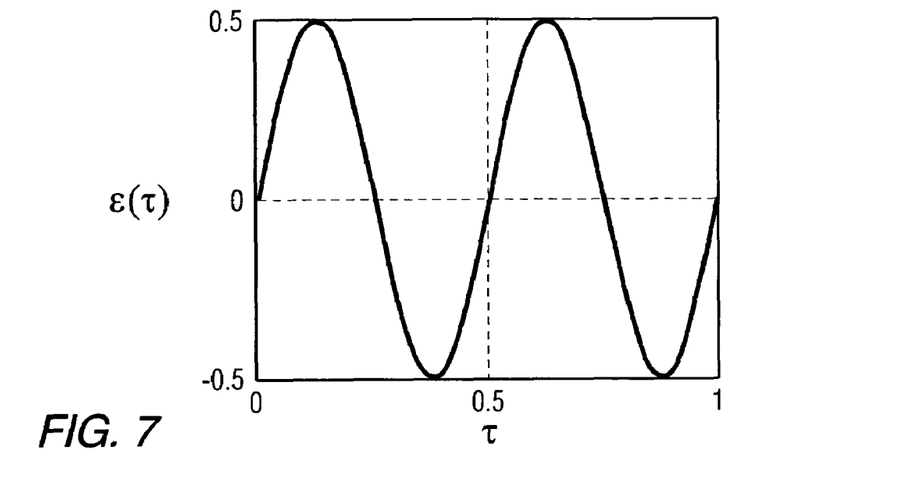
FIG. 7 is a plot of error detector characteristics versus timing error.
Figure 8:
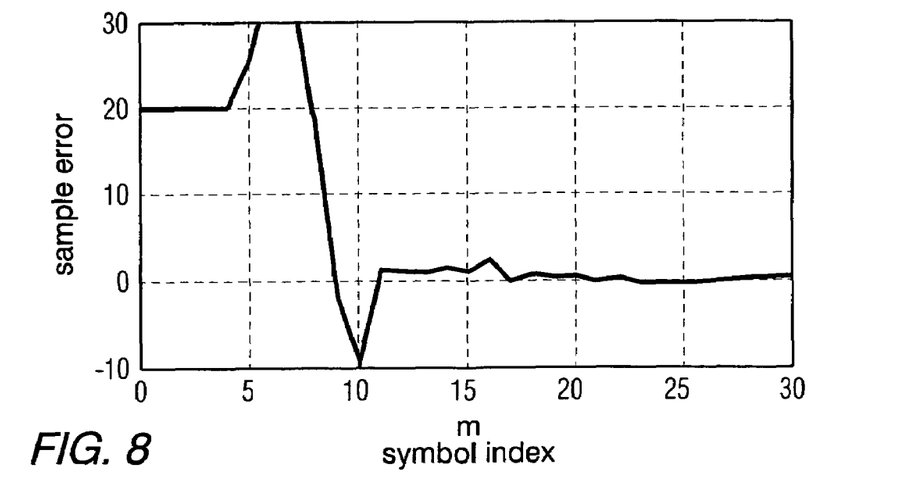
FIG. 8 is a plot of symbol timing error during acquisition and tracking.

A plot of this error signal as a function of timing error is shown in FIG. 7. FIG. 8 is a plot of error detector characteristic vs. timing error over 1 symbol time showing the half-off ambiguity.

It is important to consider that this timing metric has 2 stable points (cross zero with positive slope), which are referred to as normal and half-off. However we did not account for the overlap with adjacent symbols when the timing error is large. This would have the effect of reducing the magnitude squared value of BPSK(n). This property is exploited in the computation of the parameter diff, which is used to determine the half-off symbol timing error condition. The variable diff is indicative of the filtered and normalized difference between the on-time and half-off BPSK symbol energies.

$$diff = \frac{15 \cdot diff}{16} + \frac{|BPSK|^2 - |BPSKh|^2}{16 \cdot sympeakhold}.$$

The on-time condition produces a positive diff value, whereas the half-off condition produces a negative diff value. This property of diff is used to resolve the half-off symbol timing error ambiguity.

A more useful expression for the timing error in this application can be derived. The timing error units are converted from radians to signal samples by multiplication with 128/a. The value should be normalized by the square of the symbol magnitude; however, normalization with the longer term peak of this quantity sympeakhold is preferred to suppress this error when the signal input is lost or small. In addition both on-time and half-off BPSK values should be used, before the signal is known to be valid, until the half-off ambiguity is resolved. Therefore the following expression for the sample timing error samperr is used in the symbol tracking PLL.

$$samperr = \frac{128}{\pi} \cdot \frac{Re(BPSK) \cdot Im(BPSK) + Re(BPSKh) \cdot Im(BPSKh) \cdot (validsigout = 0)}{sympeakhold}.$$

Some of the internal and conditional loop parameters necessary for computing samperr are computed by the following algorithm:

---

"Algorithm to update conditional loop parameters when input signal is valid"
"Compute sympeakhold & validsigin for flywheel over signal fades"

sympeakhold =

$$\max\left[|BPSK|^2, |BPSKh|^2, \frac{128 + 127 \cdot validsign \cdot (g < 0.5)}{256} \cdot sympeakhold\right]$$

"validsigin if real & imag parts of main carrier are within acceptable range"

validsigin = $(Re(CAR)^2 > 16 \cdot sympeakhold) \wedge (Re(CAR) > 4 \cdot |Im(CAR)|)$ if validsigin ; "update tracking if valid input signal"

$$diff = \frac{15 \cdot diff}{16} + \frac{|BPSK|^2 - |BPSKh|^2}{16 \cdot sympeakhold}$$

if diff > 0.125, then let validsigout = 1 , endif
    if diff < −0.125 ; "half off symbol timing detected"
        diff = 0
        halfadj = −135 ; "adjust half off"
    else halfadj = 0
    endif $$samperr = \frac{128}{\pi} \cdot$$
$$\frac{Re(BPSK) \cdot Im(BPSK) + Re(BPSKh) \cdot Im(BPSKh) \cdot (validsignout = 0)}{sympeakhold}$$

if enabletrack = 0 ; "initialize on first validsigin iteration"
        enabletrack = 1
        samperrmag = 1
        g = 1
        g2 = 1
    endif
endif.

---

The algorithm shown above for updating loop parameters when the input signal is valid (validsigin=1) is summarized as follows: The sympeakhold is computed (as illustrated by block 204) as the maximum of either magnitude squared values of BPSK or BPSKh values or a filtered decaying value of the previous sympeakhold value. The use of Sampeakhold instead of simply the energy of the present symbol reduces the effects of noise and fading in the computation of samperr.

This is used for its flywheel characteristic over the short term fades. The input signal is determined to be valid (validsigin=1) (block 206) when the ratio of the main carrier real and imaginary parts are within an acceptable range. The diff signal is then updated as previously described, and compared to thresholds (block 208) to determine if the acquisition timing is either on-time, or the half-off ambiguity has been detected. If the half-off condition is detected, then the sample slip halfoff adjustment value is set to 135 samples to correct the slip buffer for this symbol in a subsequent algorithm section to be described later. The sample error samperr is then computed as previously described (block 210). The enabletrack value (block 212) is used to determine if this is the first time the validsigin=1 condition occurs. If enabletrack=0, then the values of enabletrack, samperrmag, g and g2 are initialized as shown in block 213, to begin tracking. The values g and g2 are used to adaptively control the loop gain. Half-off symbol timing ambiguity is resolved with the validsigin, diff, validsigout, and halfadj processing.

The remaining loop parameters to derive sampoffraction (fractional number of samples for timing adjustment in the slip buffer) and slip (integer number of samples for timing adjustment in the slip buffer) values for feedback to the input sample slip buffer and fractional interpolator are computed by the following algorithm:

---

"Algorithm to compute loop parameters for sampoffraction & slip"

$$samperrfilt = \frac{31 \cdot samperrfilt + samperr}{32}$$

$$samperrmag = \frac{31 \cdot samperrmag + |samperrfilt|}{32}$$

$$g = \min\left[1, \max\left(\frac{1}{16}, \frac{15 \cdot g}{16} + \frac{samperrmag}{64}\right)\right]$$

$$g2 = \max\left(\frac{127 \cdot g2}{128}, \frac{1}{64}\right)$$

$$slope = \max\left[-0.03, \min\left(0.03, \frac{slope + samperr \cdot validsigout \cdot g2}{1024}\right)\right]$$

sampoff = sampoff + $g^2$ · samperr + slope
limit = 32 · $g^2$ · g2
"Compute sampoffraction & slip for feedback to sample slip buffer/interpolator"
sampoffraction = sampoffraction + slope + ...
      + max[−limit,min(limit,sampoff −
      sampoffraction − slope)]
slip = round(sampoffraction)
sampoffraction = sampoffraction − slip
slip = slip + halfadj.

---

The algorithm to compute sampoffraction and slip values for feedback to the input sample slip buffer and fractional interpolator is summarized as follows: The adaptive loop gain g is defined as a function of the absolute value of the filtered sample error signal samperr, as shown in block 214. This filtering is accomplished through intermediate IIR filtered signals samperrfilt (filtered samperr) and samperrfiltmag (filtering of the magnitude of samperrfilt). This has the effect of increasing the loop gain when large sample timing errors are consistently detected. The reason for first filtering samperr before taking the absolute value is to desensitize the adaptive gain to random timing noise, while the absolute value of this timing error samperrmnag indicates a more persistent timing error bias. Therefore the gain is increased when the timing error is persistent instead of due to random noise perturbations.

The invention autonomously acquires and reacquires symbol timing as it deems necessary, requiring no external control. This is done with the Init g, g2, enabletrack, samperrmnag, and Init when first valid block 212 is declared. It is also done with adaptive gains g and g2. So there are several interacting components that work together to make this operate autonomously. Adaptive gains g and g2 provide fast tracking immediately after acquisition, then reduce the tracking error after steady state when the gains are reduced (loop bandwidth is narrowed). This reduces error by averaging noisy samples for estimation over a longer time constant. This is uniquely accomplished in the algorithm for sampoffraction and slip where samperrfilt and samperrfiltmag are used as a proxy for internal timing tracking error, which is then used to adaptively adjust loop gains for more accurate tracking.

Adaptive loop gain g2 is defined simply as a decaying value from its initialized value at acquisition. The slope (block 216) is used to track a symbol timing frequency error or phase slope, if any, instead of a phase error. This slope is a filtered version of samperr which produces a second-order PLL characteristic. The symbol timing error correction value sampoff is then computed (block 218) as an integrated (accumulated) function of its previous value, the estimated (noisy) sample error for this symbol samperr weighted by the square of adaptive gain g, and the slope (frequency error). This sampoff value is separated as an integer part slip plus a fractional part sampoffraction. This value of slip is further adjusted by the halfadj value as previously described. The slip value is used to adjust the input slip buffer, and the sampoffraction value adjusts the input sample interpolator, both described previously. This closes the feedback loop such that the symbol timing is eventually acquired and tracked for normal synchronous operation of OFDM demodulation. Computing the slope allows a flywheel function when signal is faded. To avoid large numbers, we simply use the error from nominal modulo 270 (samples per symbol) samperr instead of the absolute sample index.

The algorithm operates at its own determined symbol rate, although it is possible to call the symbol tracking function asynchronously to process whatever new input samples are available to it, and output an appropriate number of output symbols, if any. The algorithm is designed such that all variables are initialized to zero; this is especially important for some variables used in recursive filters where a previous value is expected. Vectors for windowing coefficients and the complex exponential used for the BPSK demodulation should be precomputed and stored for computational efficiency. Acquisition or reacquisition occurs autonomously as necessary, so no explicit control is needed.

The symbol tracking algorithm operates as a second-order phase-locked loop (PLL). The phase error, or symbol timing error, is derived from the demodulated BPSK symbol outputs to yield an error signal approximately proportional to the timing error when this error is small. Since this type of phase detector cannot reliably distinguish between the on-time and half-off symbol tracking conditions, additional functionality is provided to resolve this ambiguity within the symbol tracking algorithm. The loop filter is adaptive, as the gain is dynamically adjusted as a function of the tracking condition. This allows the PLL to quickly acquire and track when the signal is present, and coast during signal outages. The output of the loop filter is used to derive a symbol timing adjustment value for each symbol period. This timing adjustment consists of both an integer and fractional sample error value, which is used to adjust the slip buffer, and fractional interpolator operating on the input samples. This negative feedback of the estimated timing error brings the timing error to an acceptably small value for accurate tracking.

Figure 9:
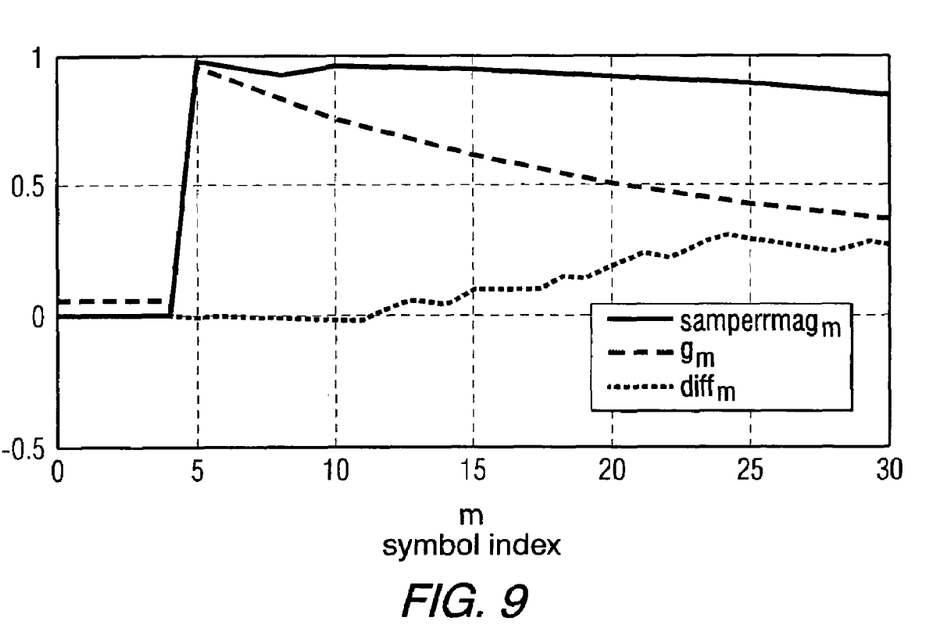
FIG. 9 is a plot of several signals of interest in an acquisition and tracking example.

FIG. 9 is a plot of example symbol timing error during acquisition and tracking. FIG. 9 illustrates the symbol timing acquisition and tracking performance. This example is simulated with a typical carrier frequency error with a pair of −20 dB first adjacent interferers with a modest carrier-to-noise density ratio of 70 dB/Hz. The initial symbol timing error was set to 20 samples offset. The timing error becomes sufficiently small for start of demodulation after about 12 symbol times, and settles to a small tracking error after about 20 symbol times due to the adaptive loop gain function.

This invention provides a symbol acquisition and tracking algorithm for an HD Radio™ AM receiver modem. The functions illustrated in the drawings and described above can be implemented using known circuit components, including but not limited to, one or more processors and/or application specific integrated circuits. The algorithm is used after carrier acquisition and tracking, and before an equalization algorithm within the modem. This symbol tracking algorithm also performs phase compensation for any fractional sample timing error within the symbol tracking loop, eliminating the need for phase slope correction across subcarriers after subsequent OFDM FFF demodulation. Simulation results show good performance under typical noise and interference conditions that can be experienced in the receiver environment. The symbol tracking performance was shown to be good whenever conditions allow decoding of the digital signals with error correction. Therefore the symbol tracking was never the limiting factor for digital coverage. Preliminary field testing of receivers using this symbol tracking algorithm confirmed the simulation results.

While the invention has been described in terms of several examples, it will be apparent to those skilled in the art that various changes can be made to the described examples without departing from the scope of the invention as set forth in the following claims.

What is claimed is:

1. A method for symbol tracking in AM in-band on-channel radio receivers, the method comprising the steps of:
   receiving a stream of time domain samples;
   assembling a set of the time domain samples equal to a symbol time plus a half symbol delay in response to a symbol timing adjustment value for each symbol period;
   interpolating the time domain samples;
   partitioning the interpolated time domain samples into a first group of samples representing half-off symbols and a second group of samples representing on-time symbols;
   processing the first and second groups of samples to produce the symbol timing adjustment value; and
   outputting the second group of samples representing on-time symbols at a symbol rate.

2. The method of claim 1, wherein the first and second groups of samples overlap.

3. The method of claim 1, wherein the timing adjustment value includes a fractional interpolation control value.

4. The method of claim 1, further comprising the step of:
   applying a window/fold function to both the on-time symbol samples and the half-off symbol samples.

5. The method of claim 1, wherein the stream of time domain samples are received on a main carrier and a pair of BPSK subcarriers and the method further comprises the step of:
   demodulating symbol values for the main carrier and the BPSK subcarriers.

6. The method of claim 5, further comprising the step of:
   deriving a symbol timing error from the demodulated BPSK symbols.

7. The method of claim 6, further comprising the step of:
   resolving half-off symbol timing error ambiguity.

8. The method of claim 6, further comprising the step of:
   normalizing the symbol timing error using a symbol peak value.

9. The method of claim 1, further comprising the step of:
   adaptively controlling loop gain in the processing step.

10. The method of claim 1, further comprising the step of:
    computing a slope variable in the processing step.

11. An apparatus for symbol tracking in AM in-band on-channel radio receivers, the apparatus comprising:
    an input for receiving a stream of time domain samples;
    a processor for assembling a set of the time domain samples equal to a symbol time plus a half symbol delay in response to a symbol timing adjustment value for each symbol period, interpolating the time domain samples, partitioning the interpolated time domain samples into a first group of samples representing half-off symbols and a second group of samples representing on-time symbols, and processing the first and second groups of samples to produce the symbol timing adjustment value; and an output for outputting the second group of samples representing on-time symbols at a symbol rate.

12. The apparatus of claim 11, wherein the first and second groups of samples overlap.

13. The apparatus of claim 11, wherein the timing adjustment value includes a fractional interpolation control value.

14. The apparatus of claim 11, wherein the processor applies a window/fold function to both the on-time symbol samples and the half-off symbol samples.

15. The apparatus of claim 11, wherein the stream of time domain samples are received on a main carrier and a pair of BPSK subcarriers and wherein the processor demodulates symbol values for the main carrier and the BPSK subcarriers.

16. The apparatus of claim 15, wherein the processor derives a symbol timing error from the demodulated BPSK symbols.

17. The apparatus of claim 16, wherein the processor resolves half-off symbol timing error ambiguity.

18. The apparatus of claim 16, wherein the processor normalizes the symbol timing error using a symbol peak value.

19. The apparatus of claim 11, wherein the processor adaptively controls loop gain in the processing step.

20. The apparatus of claim 11, wherein the processor computes a slope variable in the processing step.

* * * * *

UNITED STATES PATENT AND TRADEMARK OFFICE
CERTIFICATE OF CORRECTION

| | |
|---|---|
| PATENT NO. | : 7,733,983 B2 |
| APPLICATION NO. | : 11/273099 |
| DATED | : June 8, 2010 |
| INVENTOR(S) | : Brian William Kroeger and Kun Wang |

It is certified that error appears in the above-identified patent and that said Letters Patent is hereby corrected as shown below:

Detailed Description of the Invention

Column 5, Line 28
"...IFFY..." should read "...IFFT..."

Column 7, Line 25
"...174(,256..." should read "...174), 256)..."

Column 7, Line 50
"...$f_c(t=+\tau$..." should read "...$f_c \bullet (t+\tau)$..."

Column 7, Line 55
"...$f_c(t=+\tau$..." should read "...$f_c \bullet (t+\tau)$..."

Column 7, Line 59
"...$e^j \bullet (2$..." should read "...$e^j(2$..."

Column 7, Line 65
"...D∗...." should read "...D*..."

Column 8, Line 1
"...Q∗...." should read "...Q*..."

Column 8, Line 52
"...128/a..." should read "...128/π..."

Column 9, Line 16
"...validsign..." should read "...validsigin..."

Signed and Sealed this
Fourth Day of January, 2011

David J. Kappos
*Director of the United States Patent and Trademark Office*

CERTIFICATE OF CORRECTION (continued)
U.S. Pat. No. 7,733,983 B2

Column 9, Line 30
"...validsignout..." should read "...validisgout..."

Column 10, Line 12
"...saperrfit..." should read "...samperrfit..."

Column 10, Line 46
"...samperrmnag..." should read "...samperrmag..."

Column 10, Line 52
"...samperrmnag..." should read "...samperrmag..."